United States Patent [19]

Ando

[11] Patent Number: 4,755,732
[45] Date of Patent: Jul. 5, 1988

[54] MICROANGLE DRIVE SYSTEM FOR STEPPING MOTOR AND MICROANGLE DRIVE CIRCUIT THEREFOR

[75] Inventor: Atsushi Ando, Hachioji, Japan

[73] Assignee: Melec Co., Ltd., Tokyo, Japan

[21] Appl. No.: 54,908

[22] Filed: May 27, 1987

[30] Foreign Application Priority Data

Oct. 16, 1986 [JP] Japan .................................. 61-246248
Nov. 24, 1986 [JP] Japan .................................. 61-279379
Feb. 5, 1987 [JP] Japan .................................. 62-25256

[51] Int. Cl.$^4$ ............................................. H02P 8/00
[52] U.S. Cl. ..................................... 318/696; 318/685
[58] Field of Search ................................ 318/696, 685

[56] References Cited

U.S. PATENT DOCUMENTS 3,878,445  4/1975  Kirkham et al. .................... 318/308
4,126,819  11/1978 Stobbe et al. ........................ 318/810

FOREIGN PATENT DOCUMENTS 1402874  8/1975  United Kingdom .

Primary Examiner—William M. Shoop, Jr.
Assistant Examiner—M. Bergmann
Attorney, Agent, or Firm—Edwin E. Greigg

[57] ABSTRACT

A microangle drive circuit for a stepping motor and the system therefor comprising output elements pairs of which are connected to one another in series, a sense resistance connected to the output elements in series to make a motor coil control circuit for a phase or coil, a stepping motor control circuit made for n-phases, and motor coils. These circuit and system increase accuracy in rotation and stop by dividing the rotation angles of the stepping motor into microangles.

6 Claims, 13 Drawing Sheets (A,B,C,D)

(A,B,C,D,E)

(B,C,D,E)

(B,C,D,E,$\bar{A}$)

(C,D,E,$\bar{A}$)

Phases energized (A, B, C, D)

Phases energized (A, B, C, D, E)

Phases energized (B, C, D, E)

Phases energized (B, C, D, E, $\bar{A}$)

Phase of energization (A, B, C, D)

Phase of energization (A, B, C, D, E)

Phase of energization (B, C, D, E)

Phase of energization (B, C, D, E, $\overline{A}$)

⋮

Phase of energization (A, B, C, D)

Phase of energization (A, B, C, D, E)

Phase of energization (B, C, D, E)

Phase of energization (B, C, D, E, $\bar{A}$)

MICROANGLE DRIVE SYSTEM FOR STEPPING MOTOR AND MICROANGLE DRIVE CIRCUIT THEREFOR

BACKGROUND OF THE INVENTION

A stepping motor is driven steppingly in response to input pulses and many types of stepping motors such as two phase or multiphase types are well known. For instance, a five-phase stepping motor however has the following drawbacks. Namely, a single pulse may drive the motor at angles of 0.72° or 0.36°, but such rotation angles are still rough and does not bring about a smooth rotation of the motor. Further, there is found mechanical sympathetic vibration between the motor and the drive frequency in which it happens that the motor cannot be driven.

Then, it is required for such a drive system that electric currents of motor coils A and B and so forth are controlled and a direction of a composite torque vector is gradually varied so as to drive the motor steppingly at angles of 0.072° or 0.036° with a single pulse by dividing the angles of 0.72° into one tenth or one twentieth in order to overcome the above-mentioned particular drawbacks of the stepping motor.

To satisfy such a requirement, the following method or means is adopted conventionally. Namely, as shown in FIG. 14, four output elements Tr1, Tr2, Tr3 and so forth are connected to bridge every one of the coils of the motor. A +V voltage is impressed to each of the motor coils A, B and so forth so that the drive current may flow through the motor coils A, B and so forth. The drive current through the motor coils A and B, is detected by means of sensing resistances R1 and so forth for detecting the drive current so as to take out the result one by one. An output element Tr is made independent for every one of the motor coils A, B and so forth so as to carry out a switching control so that microangle drive of the motor may be carried out by gradually varying the torque vectors from E to O to E. Accordingly, in the case of the five-phase stepping motor, five motor coil control circuits M1-M5 control the drive current for the five motor coils A, B, C, D, and E. Each of output elements Tr1-Tr20 are controlled by means of suitable switching so as to control the current for the stepping motor.

However, this system has the following disadvantages or drawbacks.

(1) Since the four output elements Tr1, Tr2, Tr3, Tr4 and so forth are connected into a bridge for every phase so as to control the motor by detecting the drive current, in the case of a stepping motor of n-phases, a motor coil control circuit M has to be prepared for n-pieces; namely, 4n-pieces of an output element Tr (20 pieces for a 5-phase pulse motor), n-pieces of a detecting circuit (5 pieces for a 5-phase pulse motor). Therefore, the entire circuit becomes complex and therefore increases manufacturing cost.

(2) Since a +V voltage is controlled every phase, switching control is necessary for at least n-pieces of the output element Tr; namely switching control of a rated current is carried out by the output element of (n−1) and switching control of a microangle drive current is controlled by the one remaining output element Tr. As a result, it brings about disadvantages of electric power loss due to generation of heat of the n-piece output elements Tr and produces switching noises.

(3) Further, since switching control is given to a +V voltage every phase, a ripple occurs to a rated current and a microangle drive current flows through the motor coils A, B and so forth. As a result, it lacks stability of a stop position when the motor stops.

SUMMARY OF THE INVENTION

This invention relates to a microangle drive system for a stepping motor and a microangle drive circuit therefor, which are more simple in construction and increase accuracy in rotation and stop position by dividing the rotation angles of the stepping motor into microangles in comparison with those of the conventional stepping motor.

An object of this invention is to provide a microangle drive system for a stepping motor and a microangle drive circuit therefor which may: (1) decrease output elements and detecting circuits so as to make the whole circuit simple and keep its manufacturing cost down in comparison with the conventional stepping motor, (2) minimize loss of electricity due to generation of heat of the output elements and decrease switching noises, and (3) remove occurance of a ripple to a rated current and a microangle drive current which flows through motor coils so as to improve smooth rotation of the motor and stability of its stop position.

The microangle drive circuit of the first embodiment comprises output elements Tr1, Tr2,--- pairs of which are connected to one another in series, a sense resistance R1 connected to the side of ground of the output elements Tr2, Tr4 in series to make a motor coil control circuit M1 for a phase, a stepping motor control circuit S made by connecting a plurality of the motor coil control circuits M1-----for n-phases in parallel, and motor coils connected to one another end-to-end in a ring, each of the connection points thereof being connected to each of the connection points of the output elements correspondingly.

The microangle drive circuit of the second embodiment comprises a motor coil control circuit for a phase made by connecting pairs of output elements in series, rated current drive circuits made by connecting a plurality of the motor coil control circuits for n-phases in parallel, a sense resistance for detection of a rated current connected to the output sides of the rated current drive circuits in series, motor coils connected to one another in a ring, each of the connection points thereof being connected to each of the connection points of the output elements correspond to output elements for a microangle drive connected to each of the connection points of the output elements, the output elements for a microangle drive being connected to one another in parallel, and a further sense resistance for detection of a microangle current connected to the output sides of the output elements for a microangle drive.

The circuits of the first and second embodiments as constructed above, function as follows.

Namely, as indicated by symbols a, b, c, d and e in FIGS. 2(a)-(e) motor coils A, B ---- are energized in order. The energization varies from a plus (+) to a high impedance and to a minus (−) in accord with the symbols a, b and c at a P point and at a Q point from a minus (−) to a high impedance and to a plus (+) in accord with the symbols a, b and c. Microangle drive of the stepping motor may be carried out by gradually varying a voltage at the P point and the Q point. Voltage control at the point P may be carried out by detecting a current which flows via a sense resistance R2 on the minus side (−) of the connection point between the motor coils A and B. Voltage control at the point Q may be carried out by detecting a current which flows via a sense resistance R1 on the minus side (−) of the connection point between the motor coils A and E. On the other hand, a DV voltage (+) may be controlled by detecting a current of two phases (2io) which flows via a sense resistance R4 on the minus side (−) of the connection point between the motor coils D and C. Thus, the DV voltage (+), through which a rated current of two phases (2io) always flows, is controlled.

Energization patterns from the symbols a to e in FIGS. 2(a)–(e), is cited here and control of the DV voltage (+) is carried out by only using the sense resistance R4. However, when the energization patterns change to another pattern, a sense resistance R, which controls the DV voltage (+), changes in order as shown in Table 1.

Next, the microangle drive circuit of the third embodiment is described in detail.

This circuit comprises making a motor coil control circuit for a phase by connecting pairs of output elements in series, connecting a plurality of motor coil control circuits for n-phases to make a stepping motor control circuit, connecting motor coils for n-phases to one another to make a ring or a star, connecting each of the connection points of the output elements in the motor coil control circuit to each of the connection points in the form of a ring or star, connecting a sense resistance for detection of a total current to the output terminals of the motor coil control circuits, and connecting a further sense resistance for detection of a phase current to each of the motor coils and the motor coil control circuits in series respectively.

In the case of a ring like connection of the circuit in the third embodiment motor coils A, B and so forth are energized in order, as shown from FIG. 9(a), to FIG. 9(b) to FIG. 9(c) to FIG. 9(d). In the case of a star like connection, the motor coils A, B and so forth are energized in order, as shown from FIG. 11(a), to FIG. 11(b) to FIG. 11(c) to FIG. 11(d). In the case of another connection, the motor coils A, B and so forth are energized in order, as shown in FIG. 13(a), FIG. 13(b), FIG. 13(c) and FIG. 13(d). The voltage at a certain connection point between the connection points may change from a plus (+) to a high inpedance and then to a minus (−) or from a minus (−) to a high inpedance and then to a plus (+) reversely, as the energization moves from, for example, FIG. 9(a) to FIG. 9(b) and then to FIG. 9(c). By gradually varying the voltage at such a certain connection point, it becomes possible to increase and decrease the dimensions of drive vectors gradually which are generated between each of the motor coils A, B and so forth and a rotor and different to one another. Thus, a composite vector composed by two of the drive vectors can be changed gradually so as to carry out microangle drive of a stepping motor. The voltage control at a connection point may be carried out by detecting a current which flows through a sense resistance for detecting a phase current of each of the motor coils. On the other hand, the DV voltage (+) may be controlled by detecting a current which flows through a sense resistance (R6) for detecting a total current.

Since the present invention has the above-mentioned construction and system, it enables a stepping motor to carry out microangle drive by gradually changing a composite vector composed by two of the drive vectors as it is possible to gradually increase and decrease the dimensions of the drive vectors which are generated between each of the coils and a rotor and are different from one another.

Regarding the coil through which a rated current flows, the rated current may be controlled by a sense resistance for controlling a rated current. Regarding the coil which becomes in charge of microangle drive, the current, which flows through a sense resistance for controlling microangles, may be varied to increase or decrease gradually by control switching one of the pairs of the output elements which is connected to the coil. As a result, for carrying out microangle drive, only two detecting circuits are needed, one of which is for detecting the voltage variation of the sense resistance for a rated current control and the other which is for detecting the voltage variation of the sense resistance for a microangle control. Therefore, according to the present invention a number of detection circuits can be reduced in comparison with the prior art.

When (n−1) coils or (n) coils are energized, the rated current flows through the motor coils at the DV voltage which is controlled stably by means of a rated current control circuit. Therefore, there is made a switching control by means of a microangle drive current control circuit through which a microangle drive current flows at the time of energization of (n) coils, so that occurance of a ripple may be minimized. Accordingly, occurance of a ripple through all of the coils can be reduced to 1/n in comparison with the prior art and as the result vibration of the stepping motor may be reduced greatly and stop positions of the motor may be stabilized.

Since there needs two output elements in total which receive a switching control and one of which is a semiconductor chopper and the other of which is one of two output elements in charge of microangle drive, heat loss and switching noises are minimized in comparison with the prior art in which n-pieces of the output elements have to be driven.

Further, since the above-mentioned system is adopted, a number of the output elements can be reduced to from about ½ to about ¾ in of the elements necessary the prior art and it becomes possible to compact the whole circuit and to keep its manufacturing cost down.

Furthermore, this invention may, of course apply for a stepping motor of two coils (phases) to multi-coils(phases) type.

Other objects and advantages of this invention will be apparent from the following description.

BRIEF DESCRIPTION OF THE DRAWINGS

The drawings show embodiments of this invention in which.

Figure 1:
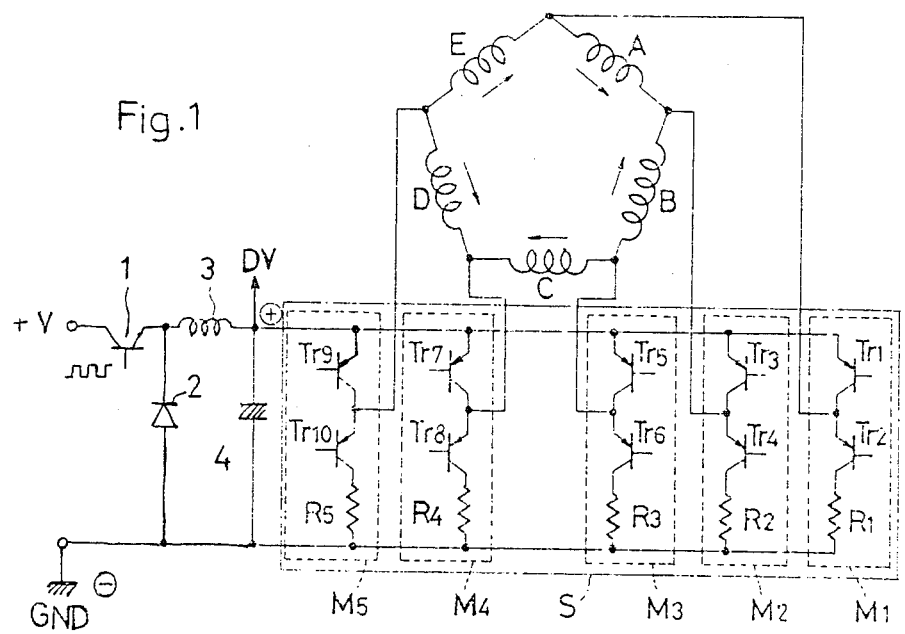
FIG. 1 is a drive circuit for the first embodiment.

In the drawings, M is a motor coil control circuit, S is a stepping motor control circuit, A to E are motor coils, R is a sense resistance, Tr is an output element, 1 is a semiconductor chopper, 2 is a flywheel diode, 3 is a reactor, and 4 is a smooth condenser.

DETAILED DESCRIPTION OF THE PREFERRED EMBODIMENTS

Figure 3:
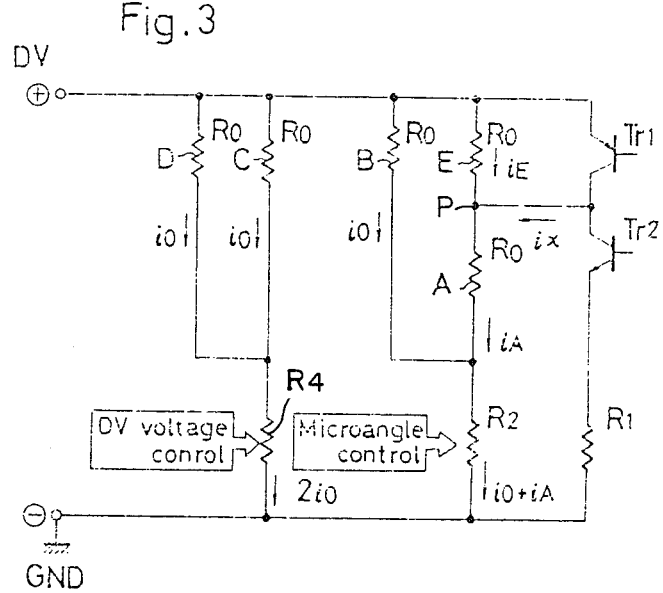
FIG. 3 is an equivalent circuit showing the circuit for five-coil(phase) energization.

The circuit of the first invention will now be described with reference to FIG. 1 through FIG. 3.

In this embodiment, a five coil (phase) stepping motor is exemplified, but two or multi-coil (phase) stepping motors may be adopted and of course it is not limited to such a five coil stepping motor.

FIG. 1 shows an embodiment of a drive circuit according to the first embodiment. This drive circuit comprises a semiconductor chopper 1 for carrying out a chopper control of an output of a DC source (not shown), a rated current detection circuit for controlling the semiconductor chopper 1 by function of switching for pulse-duration modulation (not shown), a flywheel diode 3, a smoothing condenser or capacitor 4, a stepping motor control circuit S and so forth. The DC electric source (not shown) is utilized by full-wave rectification of an AC electric source.

Next, the stepping motor control circuit will be described. First, two output elements Tri, Tr2 to Tr9, Tr10 are adjacent to one another with each pain connected to one another in series and then sense resistances R1 to R5 are connected to the output sides of these output elements in series so as to make a set of motor coil control circuits M1 to M5. The motor coil control circuits M1 to M5, which are equivalent to sets of motor coils or phases A to E, are connected to one another in parallel so as to make the stepping motor control circuit S. In the case of five-coil or phase stepping motor, five sets of the motor coil control circuits are used. The connection points of the output elements Tr1, Tr2 to Tr9, Tr10 and the connection points of the motor coils A to E of the stepping motor are connected to each other. The connection in the drawings is so called a pentagon connection. The stepping motor is driven by changing the voltage at the connection points between each of the motor coils A to E from a plus (+) to a minus (−) or and vise versa. In the event that the motor coils or phases are not five, it would be obvious to provide the numbers of the motor coil control circuits M1 to M5 which correspond to the phases of the motor. The sense resistances R1 to R5, which are inserted in the motor coil control circuits M1 to M5, are those resistances which are provided for detecting a current for each of the coils in order to make microangle drive and rated drive. By controlling the current detected by the sense resistances, it may carry out microangle drive and rated drive. The sense resistances R1 to R5 are set at a low value of about one ohm.

Figure 2A:
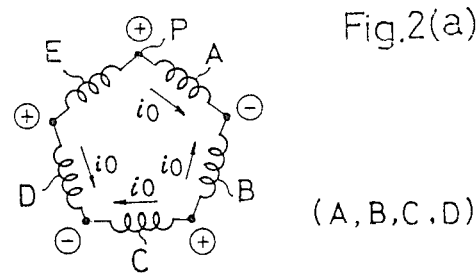
FIG. 2(a), FIG. 2(b), FIG. 2(c), FIG. 2(d) and FIG. 2(e) are diagrams of exciting coils for the first embodiment.

In the construction above, a DV voltage is obtained by controlling +V voltage of a constant-current electric source with pulse-duration modulation. The DV voltage (+) is supplied to the motor coils A to E of the stepping pulse motor and by switching the drive current the motor may be driven. Namely, in the circuit, as shown in FIGS. 2(a) to (e), by gradually changing 4–5 phase (coil) exciting sequence, a composite vector composed by the vectors generated by each of the motor coils A to E corresponding to a rotor, can be varied so that microangle drive may be obtained. In the case of FIG. 2(a), concerning the coils (phases) A and B, the output elements Tr1, Tr5, Tr4 are ON and then a current of 2io flow through the sense resistance R2. Concerning the coils C and D, the output elements Tr5, Tr9, Tr8 become ON and a current of 2io flows through the sense resistance R4. A current does not flow through the coil E since the output elements Tr1, Tr9 are in ON situation. This is further explained with reference to the diagram of vector in FIG. 4. This situation corresponds to FIG. 4 ① wherein the coils A to D are excited by a rated current io.

Figure 2B:
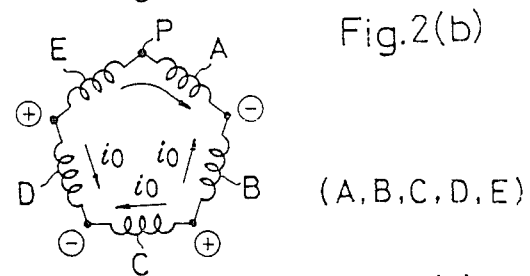

FIG. 2(b) shows an example of five coil excitation. To easily understand this case, it is described on the basis of an equivalent circuit in which resistances are substituted for the motor coils. Each of the DC resistance values of the motor coils A to E is set Ro herein.

In the coils or phases C and D, the DV voltage (+) is controlled by current detection of the sense resistance R4 so that the current of 2io flows to the sense resistance R4. The DV voltage (+) is controlled by only impedance of the coils D and C. When the volume of the current ix is gradually reduced by switching control of the output element Tr1 to be zero, the volume of each of the currents iE and iA may be varied correspondingly. The current ix flows the output element Tr1 and reaches a point P as seen in FIG. 3.

The relationship between the currents iE and iA is:

$$(iE/iA) = (Ro \cdot iE / Ro \cdot iA) = (Ro \cdot io - Ro \cdot iA)/(Ro \cdot iA) = (io - iA)/(iA)$$

Because, $DV = Ro \cdot io = Ro \cdot iE + Ro \cdot iA$.

Therefore, $(iE) = (io - iA)$. Wherein voltage drop of the sense resistance R2 is very small. It does take no account of the voltage drop.

When the output element Tr1 gradually becomes in an Off situation by switching control, the output element Tr2, contrary to this, gradually becomes in an On situation and as the result, the current iE increases from zero to (iE=0.5io) and then to (iE=io). On the other hand, the current iA is reduced to (iA=0.5io) and then to zero, finally.

Wherein it is set as follows:

The situation is FIG. 2(a) in the case of (iE=O; iA=io).

The situation is FIG. 2(b) in the case of (iE=0.5io; iA=0.5io).

The situation is FIG. 3(c) in the case of (iE=io; iA=0).

At the time, the current, which flows the sense resistance R2, is gradually reduced to 2io→0.5io→io.

Figure 2C:
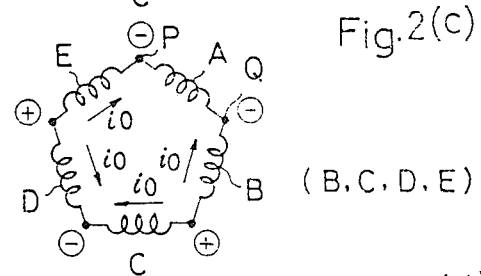
Figure 2D:
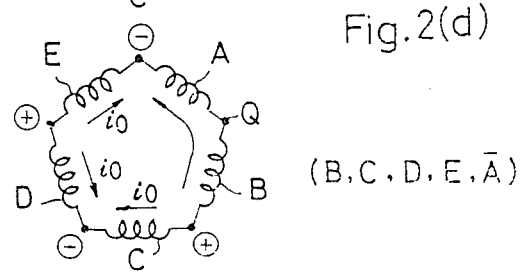
Figure 2E:
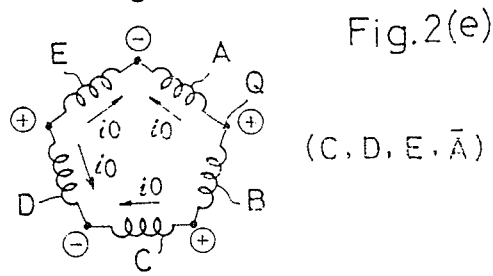

When exciting of the 4–5 coils takes place from FIG. 2(c), to FIG. 2(d) and FIG. 2(e) in order, the reverse manner of the above-mentioned is carried out. At the time, the detected current of the sense resistance R1 is increased to (io→2io).

Figure 4:
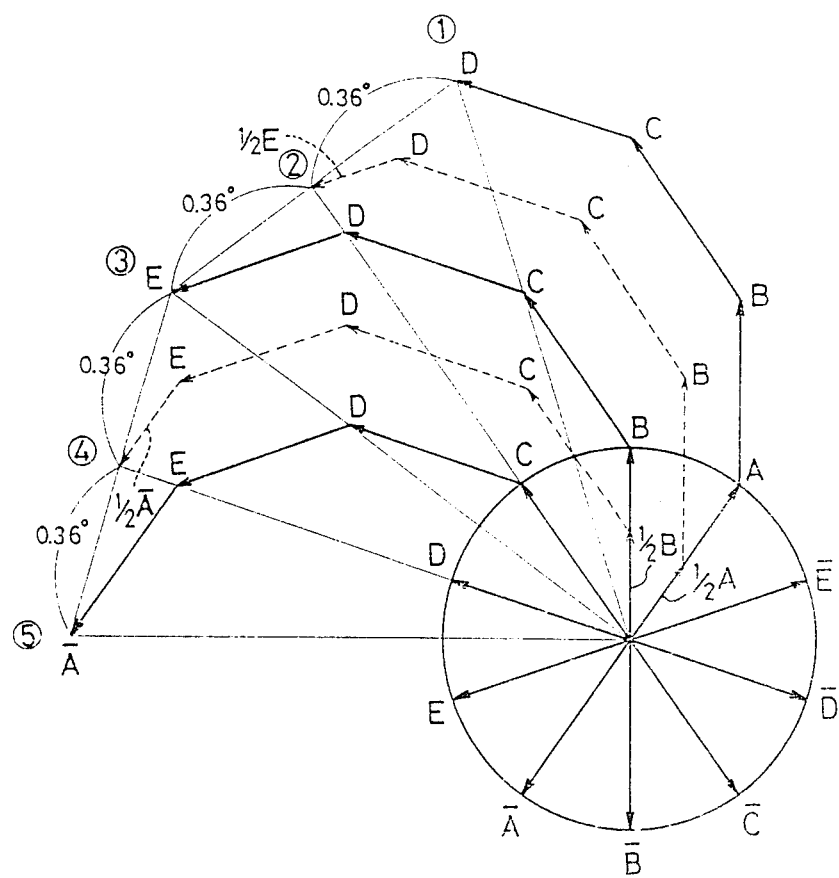
FIG. 4 is a sequence diagram of energization patterns of the first embodiment.
Figure 5:
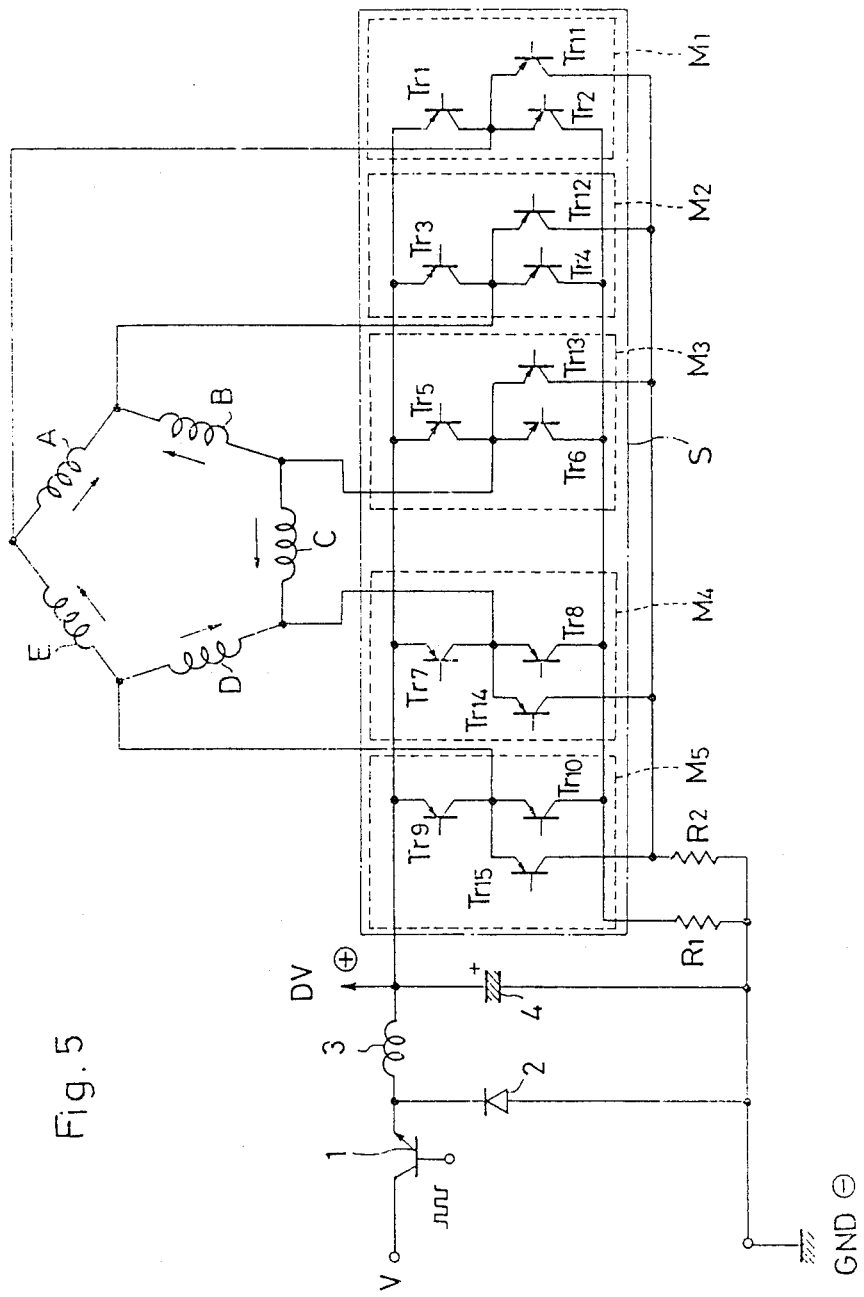
FIG. 5 is a drive circuit of the second invention.

In the vector diagram of FIG. 4, in the case of the numbers ② and ④, the coils or phases A and E, and B and $\overline{A}$ have a torque vector of ½, but this does not affect a shifting angle. Further, this vector has a dimension of 95% of a composite vector of the numbers ①, ③, and ⑤ and therefore it does not affect in a holding torque.

In accordance with the steps of excitation shown in FIG. 4, the numbers ①→②→③→④→⑤→, ---, the point P is changed to a plus (+)→a high impedance→a minus (−), as shown in FIGS. 2(a) to (c). On the other hand, the point Q is varied to a minus (−)→a high impedance→a plus (+).

By varying the voltages at the points P and Q gradually, microangle drive may be carried out with a pentagon connection.

As mentioned above, the first embodiment may be summarized as follows: Namely, the currents for three phases (coils) among the rated currents which flow five motor coils (phases), are excited by the DV voltage (+) which is obtained by controlling +V voltage by means of the semiconductor chopper 1, and the remaining two coils (phases) are excited with switching control of a set of the output elements so as to make microangle drive. The control of +V voltage by means of the semi-conductor chopper 1 may be carried out by utilizing two coils (phases).

Next, the second embodiment will be described on the basis of an example.

The circuit and the system for microangle drive of the second embodiment are substantially the same as those of the first embodiment. To simplify detection of the current for controlling DV voltage (+) and microangle drive control, the output elements Tr2, Tr4, - - - on the side of ground (GND) are connected to each other and then one sense resistance R1 for detecting a rated current is connected to those in series. At the same time, the output elements Tr11 to Tr15 for controlling microangle drive current, are connected to each of the connection points of the output elements Tr1, Tr2, --- in each of the motor coil control circuits M1, M2 ---, in parallel and then one sense resistance R2 for detecting microangle drive current is connected to these output elements TR11 to Tr15 in series. Control of DV voltage in the second embodiment is carried out by the sense resistance R1 and control of microangle drive is carried out by the sense resistance R2.

Figure 6:
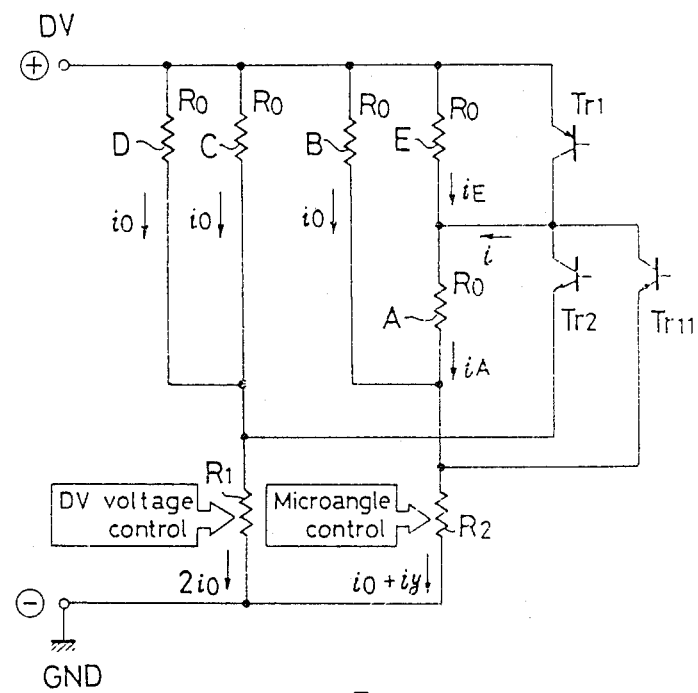
FIG. 6 is an equivalent circuit showing the circuit for five-coil (phase) energization.
Figure 7:
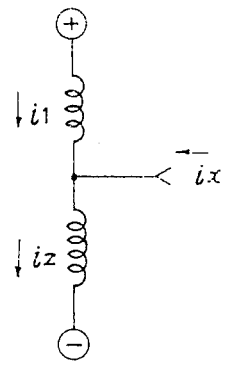
FIG. 7 is a circuit for describing motor coils of the second embodiment, which coils are adjacent to one another.

The control system of the second embodiment will be described with reference to FIG. 6 which uses an equivalent circuit.

(a) In the case of five-coil (phase) excitation, the current flows through the coils or phases C and D when the output elements Tr5 and Tr9 and the output element Tr8 on the side of ground (GND) become ON and double rated current 2io flows through the sense resistance R1 and then DV voltage (+) is controlled. On the other hand, when the output elements Tr9 and Tr5 as well as the output element Tr12 on the side of ground (GND) become ON and then the rated current io flows through the coil or phase B. Also, the microangle drive currents iE and iA flow through the coils E and A and then the total of these currents (io+iy) flows through the sense resistance R2 so as to carry out microangle drive control.

(b) Microangle drive may be obtained by controlling the output elements Tr1 and Tr11 with switching control, as in the manner of the first embodiment.

(1) When the output element Tr11 is in OFF and microangle drive current is controlled by controlling the output element Tr1 with switching control, then the current flowing through the sense resistance R2 is:

$(io+iA=io+iE+iX)$.

This means the same current control as in the first embodiment.

(2) When the output element Tr1 becomes OFF and the output element Tr11 becomes ON gradually, then a part of the current flowing through the coil E, flows through the output element Tr11 to introduce the equation (iE=iA+iX). Then, the current flowing through the sense resistance R2 becomes:

$(io+iA+iX=io+iE)$.

(3) Therefore, in the case of the second embodiment, microangle drive can be obtained by the steps 2io→1.5io→2io, as shown in FIGS. 2(a) to (e).

The following is Table 1 showing the sense resistance R when control of DV voltage (+) and microangle drive control take place. Arrows show that microangle drive is carried out.

TABLE 1

| Steps for 4 coil (phase) exciting | Excited coils (phases) | Sense resistance for DV control | Sense resistance for microangle control |
|---|---|---|---|
| 1 | A, B, C, D | | |
| | ↓ | R4 | R2 |
| 2 | B, C, D, E | | |
| | ↓ | R4 | R1 |
| 3 | C, D, E, $\overline{A}$ | | |
| | ↓ | R1 | R4 |
| 4 | D, E, $\overline{A}$, $\overline{B}$ | | |
| | ↓ | R1 | R3 |
| 5 | E, $\overline{A}$, $\overline{B}$, $\overline{C}$ | | |
| | ↓ | R3 | R1 |
| 6 | $\overline{A}$, $\overline{B}$, $\overline{C}$, $\overline{D}$ | | |
| | ↓ | R3 | R5 |
| 7 | $\overline{B}$, $\overline{C}$, $\overline{D}$, $\overline{E}$ | | |
| | ↓ | R5 | R3 |
| 8 | $\overline{C}$, $\overline{D}$, $\overline{E}$, A | | |
| | ↓ | R5 | R2 |
| 9 | $\overline{D}$, $\overline{E}$, A, B | | |
| | ↓ | R2 | R5 |
| 10 | $\overline{E}$, A, B, C | | |
| | ↓ | R2 | R4 |
| 1 | A, B, C, D | | |

Figure 8:
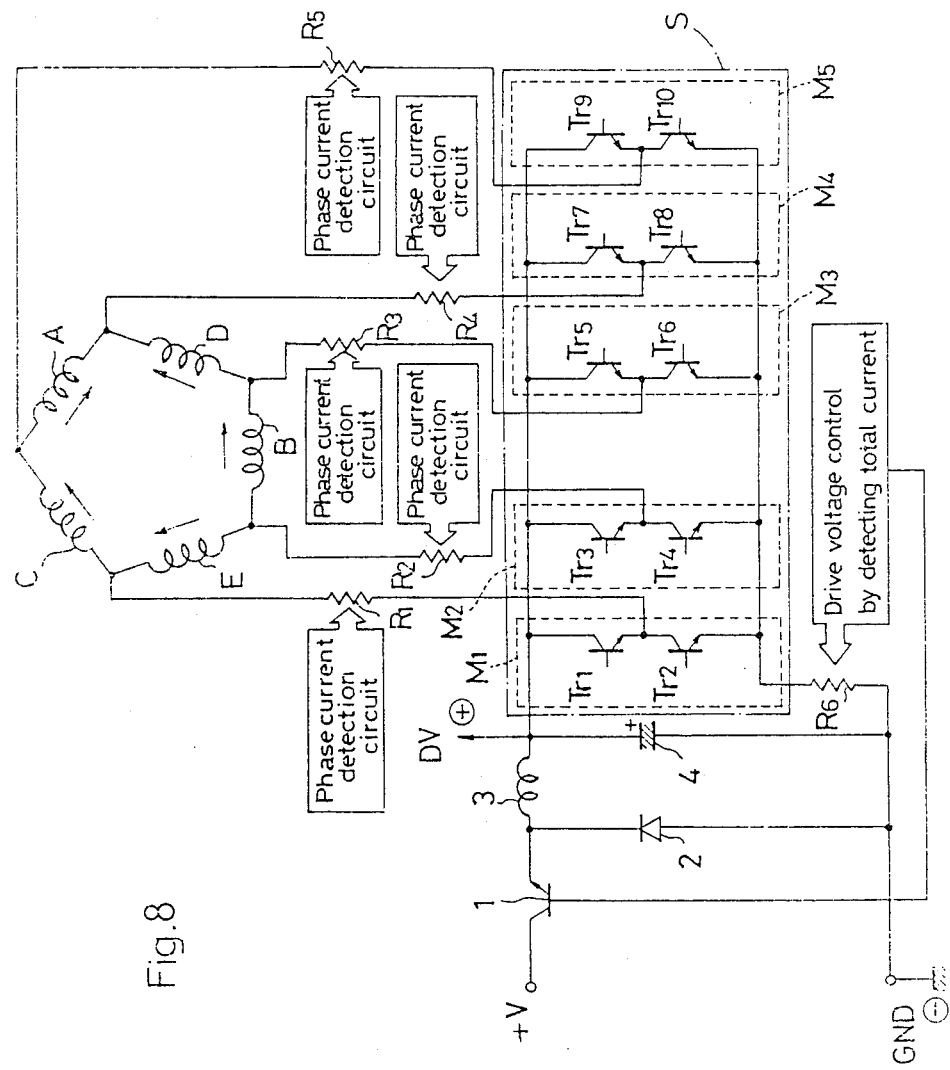
FIG. 8 is a drive circuit of a third embodiment.

Next, the third embodiment is described. In FIG. 8, the manner of connecting the output elements Tr1,Tr2 ---- Tr9 and Tr10 in a stepping motor control circuit S and also the manner of connection of motor coils A to E are the same as those in the first embodiment. There are different connection points between the first embodiment and the third embodiment that a sense resistance R6 for detecting a total current is connected to the output side of the stepping motor control circuit S, and that sense resistances R1 to R5 for phase current detection, which sense the current of each of the motor coils or phases individually, are inserted inbetween the motor coils A to E and the stepping motor control circuit S.

Figure 9A:
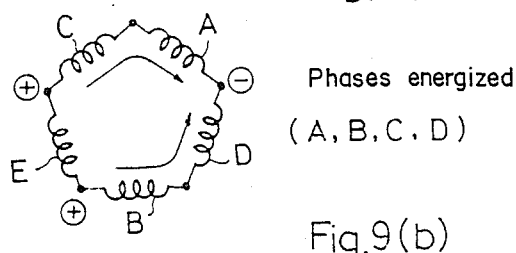
FIG. 9(a), FIG. 9(b), FIG. 9(c) and FIG. 9(d) are diagrams showing an order of energization pattern of the third embodiment.

In the above-mentioned construction, in the case of FIG. 9(a), the output elements TR1, Tr3 and Tr8 become ON and the other output elements Tr become OFF and as the result the connection point (+) made by both ends of the coil E becomes plus voltage as the current 2io flows through the phase or coil current detection sensing resistance R4. In the other coils (phases) except the coil E, the drive current flows from the connection points (+) to the connection points (−) so as to make a four phase (coil) excitation.

Figure 9B:
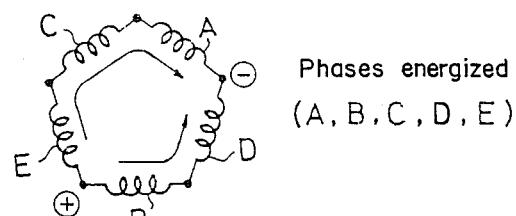

Next, when the output element Tr1 gradually changes from ON to OFF with switching control and finally becomes OFF, the drive current flows from the connection point (+) to the connection point (−) so as to make a five phase (coil) exciting state of FIG. 9(b).

Figure 9C:
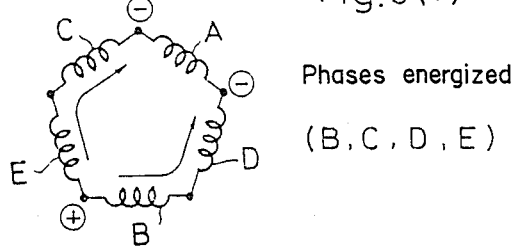

Next, the output element Tr10 in the state of OFF gradually changes to ON state with switching control so as to be a minus voltage (−) and then the drive current flows from the connection point (+) to the connection point (−). Thus, a four phase (coil) exciting state of FIG. 9(c) is obtained in which the drive current does not flow through the coil (phase) A.

Figure 9D:
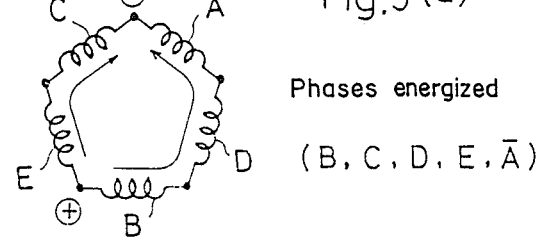
Figure 10:
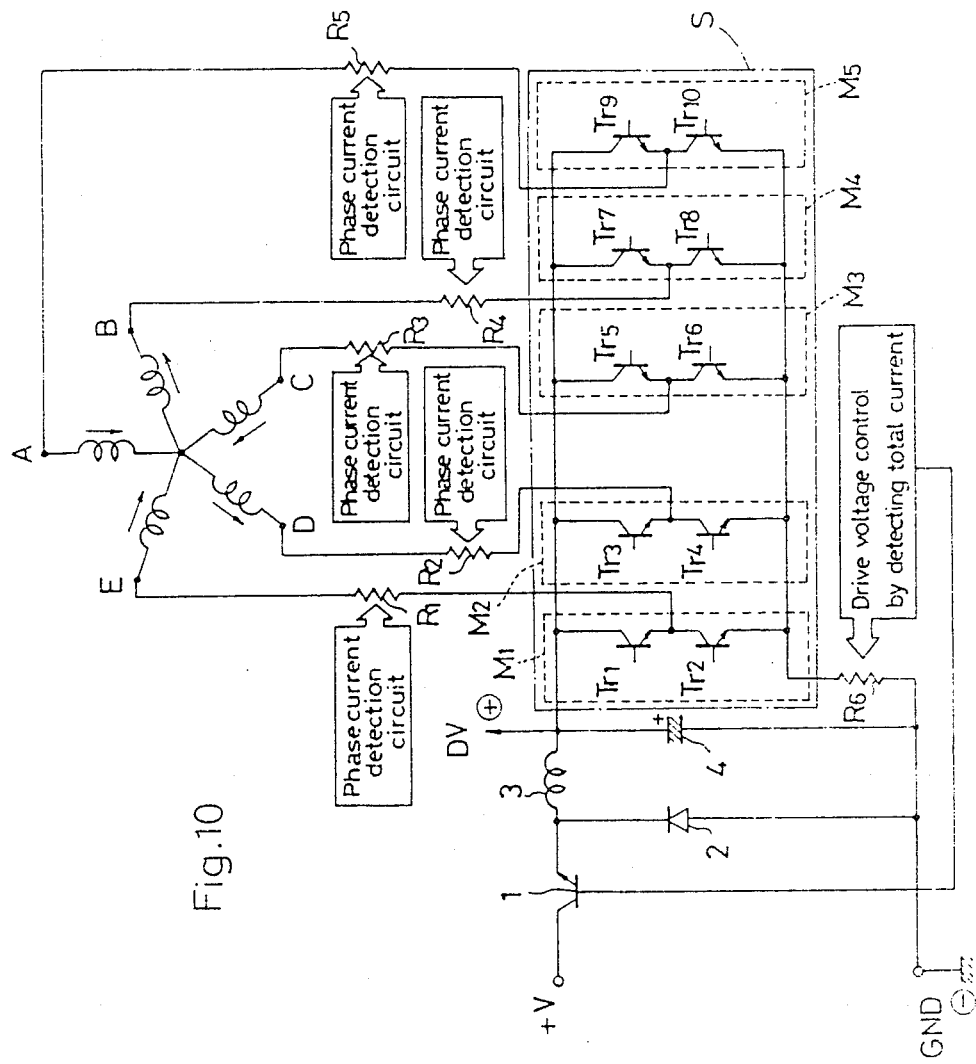
FIG. 10 is a drive circuit of the second embodiments of the third specie.

Then, the output element Tr8 gradually changes to OFF state with switching control, the drive current flows from the connection point (+) to the connection point (−) so as to make a five phase (coil) exciting state of FIG. 9(d).

Thus, microangle drive of the motor can be carried out by controlling the output element Tr to be ON and OFF in order to accord with an excitation sequence.

In other words, the output element Tr is controlled switchingly to be in ON and OFF positions for microangle drive.

Next, the fourth embodiment is described, but all of the circuit and system is the same as the fore-mentioned inventions except that a star connection is substituted for a pentagon connection as shown in FIG. 1.

Microangle microangle drive is carried out in the same manner by gradually carrying an exciting pattern as shown in FIG. 11(a) to FIG. 11(d).

Figure 11A:
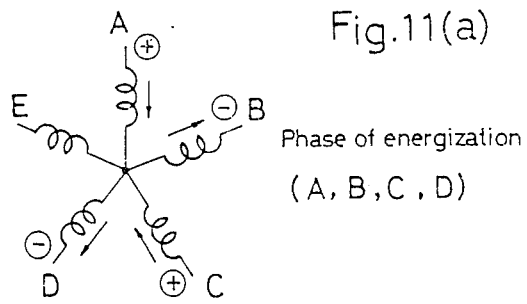
FIG. 11(a), FIG. 11(b), FIG. 11(c) and FIG. 11(d) are diagrams showing an order of energization pattern of the second embodiments of the third specie.
Figure 11B:
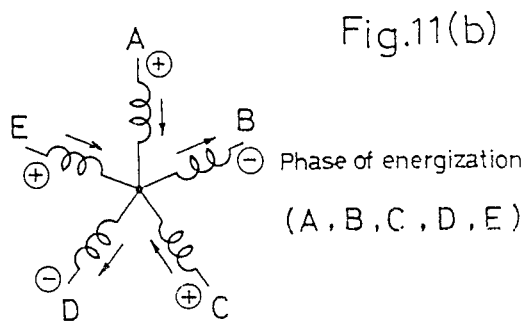

Namely, in the drive circuit S, changing of FIG. 11(a) to FIG. 11(b) may be obtained by detecting the current with the phase current detection sense resistance R1 and controlling the output element Tr1 with switching control. The state of FIG. 11(b) is obtained when the output element Tr1 finally becomes ON.

Figure 11C:
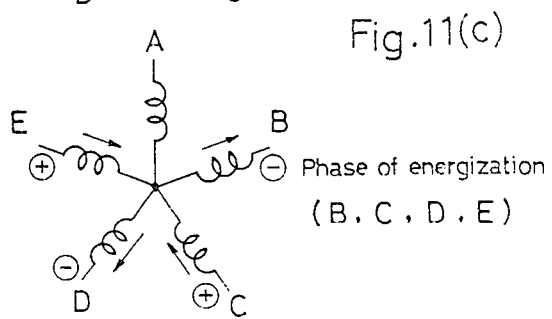
Figure 11D:
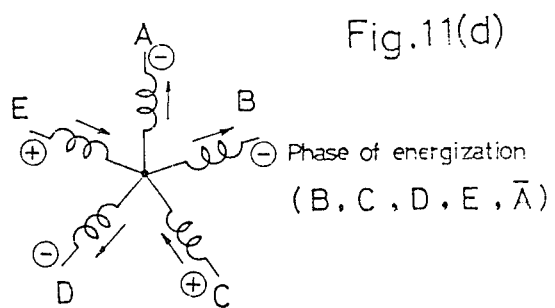
Figure 12:
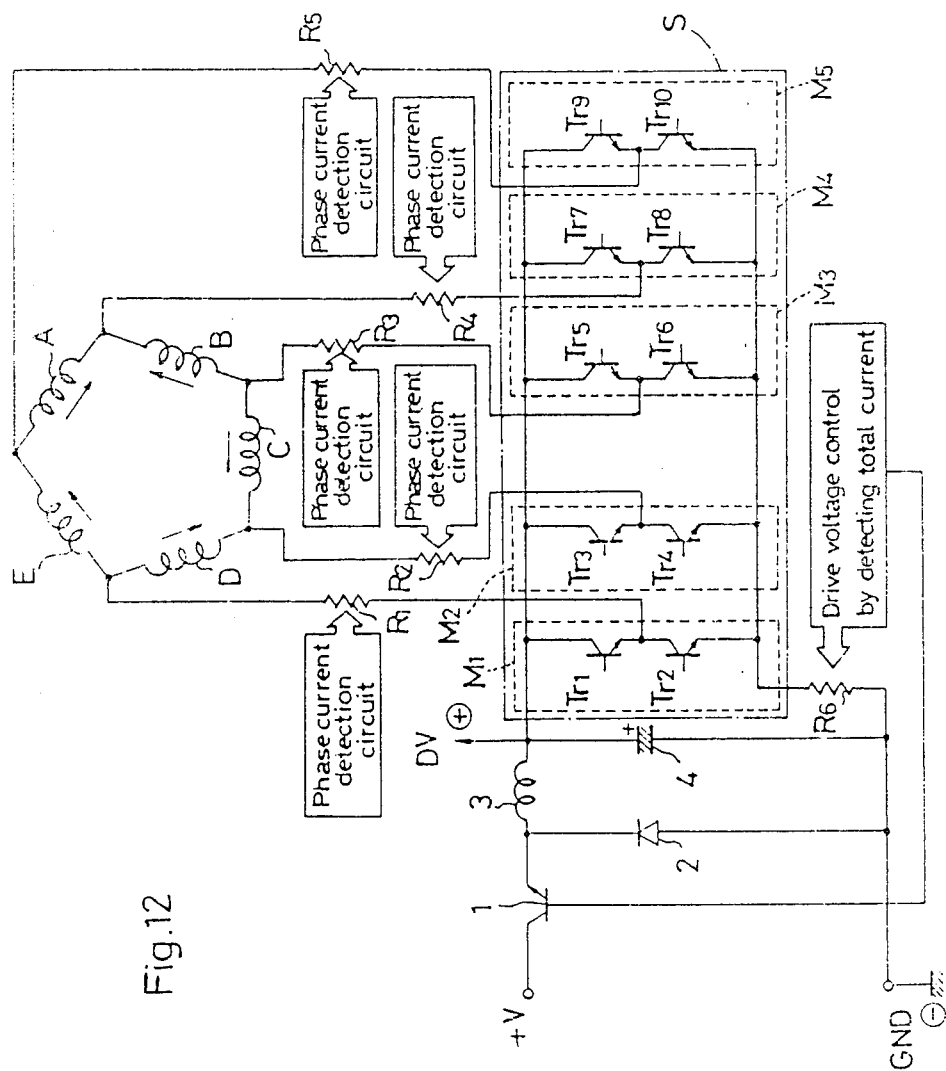
FIG. 12 is another drive circuit of the first embodiment of the third specie.

Next, changing of FIG. 11(b) to FIG. 11(c) may be obtained by detecting the current with the phase current detection sense resistance R 5 and by controlling the output element Tr9 with switching control and the state of FIG. 11(c) is obtained when the output element Tr9 becomes finally OFF.

Thus, microangle drive can be obtained by controlling the current which flows from the motor coil control circuits M1------ to the motor coils A to E in the same manner as mentioned above.

Finally, another drive system of the third embodiment is described as follows.

This system is different from the circuit of the third embodiment in that an order of the connection of the motor coils (phases) is changed. However, it is the same in operation that microangle drive may be obtained by gradually carrying out the exciting pattern as shown in FIG. 13(a), FIG. 13(b), and so forth.

Figure 13A:
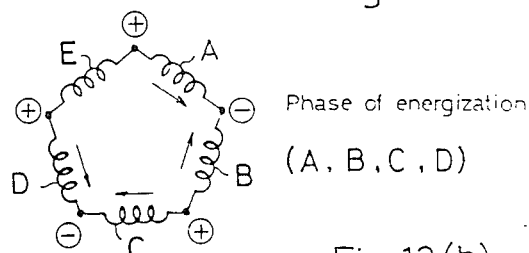
FIG. 13(a), FIG. 13(b), FIG. 13(c) and FIG. 13(d) are diagrams showing an order of another energization pattern of the first embodiment of the third specie.
Figure 13B:
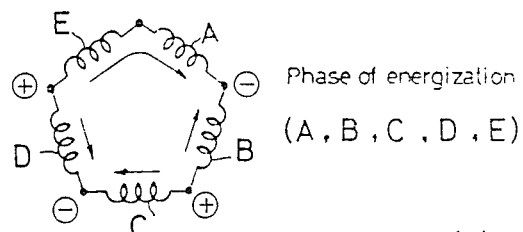

Namely, in the drive circuit S, changing of FIG. 13(a) to FIG. 13(b) may be obtained by detecting the current with the phase current detection sense resistance R1 and by controlling the output element Tr9 with switching control. When the output element Tr9 becomes finally OFF, the state of FIG. 13(b) can be obtained.

Figure 13C:
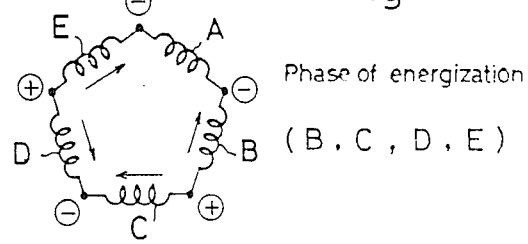
Figure 13D:
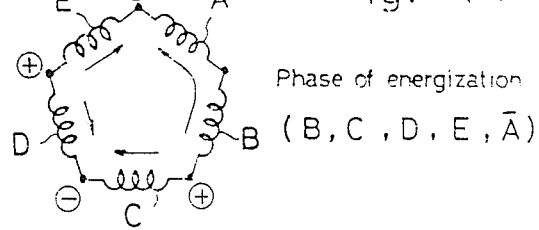
Figure 14:
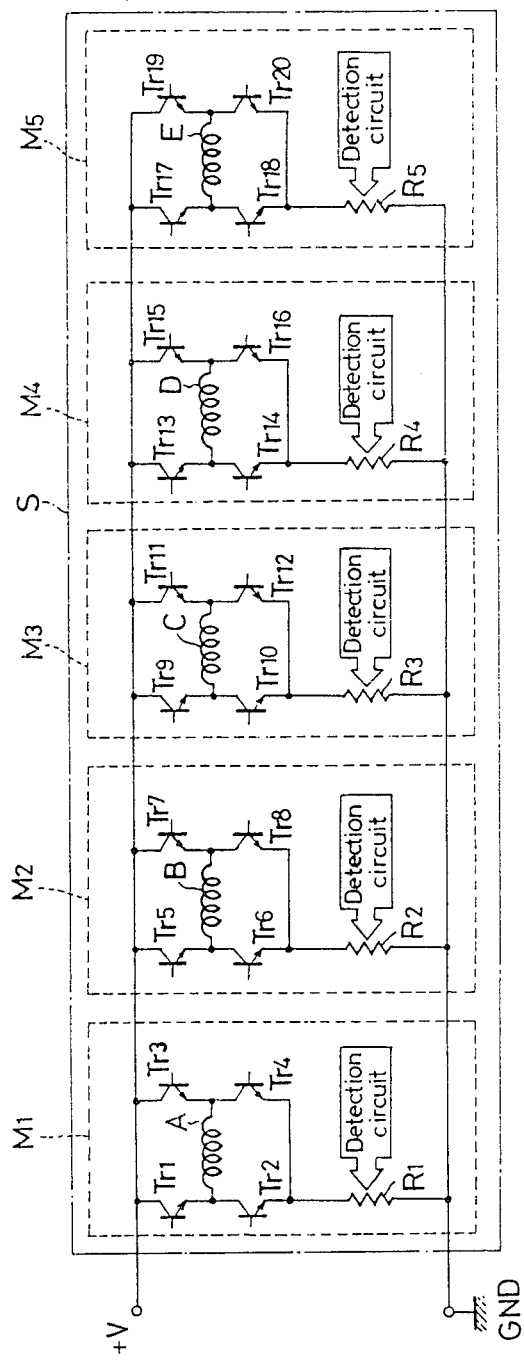
FIG. 14 is a circuit of the prior art partly broken.
Figure 15:
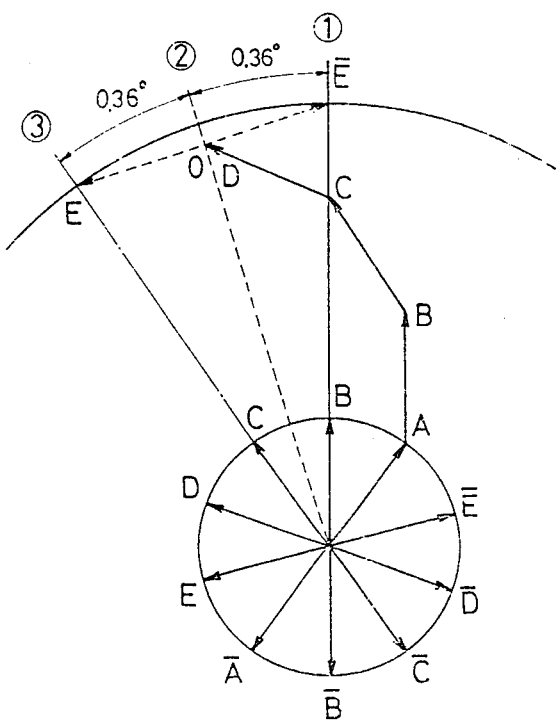
FIG. 15 is a sequence diagram of energization pattern of a circuit in the prior art.

Next, changing of FIG. 13(b) to FIG. 13(c) may be obtained by detecting the current with the phase current detection sense resistance R4 and by controlling the output element Tr10 with switching control. When the output element Tr10 finally becomes ON, the state of FIG. 13(c) can be obtained.

Thus, microangle drive may be carried out by controlling the current which flows from the motor coil control circuits M1 ----- to the motor coils A to E.

What is claimed is:

1. A microangle drive circuit for a stepping motor comprising:
    a motor coil control circuit for a phase made by connecting pairs of output element in series,
    rated current drive circuits made by connecting a plurality of the motor coil control circuits for n-phases in parallel,
    a sense resistance for detection of a rated current connected to the output sides of the rated current drive circuits in series,
    motor coils connected to one another end-to-end in a ring, each of the connection points thereof being connected to corresponding connection points of the output elements,
    output elements for microangle drive connected to each of the connection points of the output elements, the output elements for microangle drive being connected to one another in parallel, and
    a further sense resistance for detection of a microangle current connected to the output sides of the output elements for microangle drive.

2. A method for a microangle drive for a stepping motor having a microangle drive circuit in which motor coils for n-phases are connected end-to-end to one another in series to make a ring and a switching circuit is connected to each of the connection points between the motor coils respectively, which comprises:
    setting a voltage at a terminal connection of a pair of the motor coils to a plus (+) and a voltage at another terminal thereof to a minus (−),
    controlling a voltage at a connection point between the motor coils to introduce a variable drive current from the terminal of plus (+) to the point or to introduce a variable drive current from the connection point to the terminal of minus (−) so as to gradually increase or decrease dimensions of drive vectors which are generated between each of the motor coils and a rotor and have different directions from one another and gradually change a direction of a composite vector composed by two of the drive vectors.

3. A method for a microangle drive circuit for a stepping motor comprising:
    assembling a motor coil control circuit for a drive phase by connecting pairs of output elements in series,
    connecting a plurality of motor coil control circuits for n-phases to produce a stepping motor control circuit including connection points,
    connecting motor coils for n-phases to one another end-to-end to make a ring or a star and to form connection points between the motor coils,
    connecting each of the connection points of the output elements in the motor coil control circuit to each of the connection points in the form of a ring or a star, connecting a sense resistance for detection of a total current to the output terminals of the motor coil control circuits, and connecting a further sense resistance for detection of a phase current to each of the motor coils and the motor coil control circuits in series, respectively.

4. A method for a microangle drive for a stepping motor comprising assembling a motor coil control circuit for a drive phase by connecting pairs of output elements in series, connecting a plurality of the motor coil control circuits for n-phases to make a stepping motor control circuit including connection points, connecting motor coils for n-phases to one another end-to-end to make a ring and to form connection points, connecting each of the connection points of the output elements in the motor coil control circuit to each of the connection points in the form of a ring, connecting a sense resistance for detection of a total current to the output terminals of the motor coil control circuits, and connecting a further sense resistance for detection of a phase current to each of the motor coils and the motor coil control circuits in series, respectively, making opposite ends of one coil phase to be a plus voltage (+) and the opposite ends of the coil to be a minus voltage (−) when (m−1) motor coils are excited or energized, making the connection points of the (m−1)/4 motor coils in series that are located between one coil and the connection point to be a high impedance, controlling a voltage at one connection point of one coil to be changed gradually to a high impedance from the plus voltage (+) so as to make microangle drive for n-phase excitation, controlling a voltage at the connection point located between the connection point of minus of the one coil and the connection point already controlled, to be a minus voltage from a high impedance so as to make microangle drive for (n−1) phase excitation starts, repeating these steps so as to gradually increase and decrease the dimension of drive vectors which are generated between each of the motor coils and a rotor and have a different direction to one another so that a composite vector of these drive vectors may change its direction gradually.

5. A method for a microangle drive for a stepping motor comprising assembling a motor coil control circuit for a drive phase by connecting pairs of output elements in series, connecting a plurality of the motor coil control circuits for n-phases to make a stepping motor control circuit including connection points, connecting motor coils for n-phases to one another end-to-end to make a star and to form connection points, connecting each of the connection points of the output elements in the motor coil control circuit to each of the connection points in the form of a star, connecting a sense resistance for detection of a total current to the putput terminals of the motor coil control circuits, and connecting a further sense resistance for detection of a phase current to each of the motor coils and the motor coil control circuits in series, respectively, making one of n-piece motor coils in star connection to be a high impedance, introducing a voltage at each of the connection points of the motor coils of (n−1) pieces to be a plus (+) or a minus (−) alternately so as to make a (n−1) phase excitation, controlling a voltage at the high impedance connection points to be changed to a plus (+) from a high impedance so as to make microangle drive until n-phase excitation starts, controlling a voltage at the connection point of plus (+) adjacent the connection point of a high impedance, to be changed gradually to a high impedance from a plus (+) so as to make microangle drive until (n−1) phase excitation starts, making microangle drive by gradually changing a voltage at the connection point of high impedance to a minus (−) until n-phase excitation starts, and repeating these steps so as to gradually increase and decrease the dimension of drive vectors which are generated between each of the motor coils and a rotor and have a different direction to one another so that a composite vector of these drive vectors changes its direction gradually.

6. A method for a microangle drive for a stepping motor comprising assembling a motor coil control circuit for a drive phase by connecting pairs of output elements in series, connecting a plurality of the motor coil control circuits for n-phases to make a stepping motor control circuit including connecting points, connecting motor coils for n-phases to one another end-to-end to make a ring and to form connection points, connecting each of the connection points of the output elements in the motor coil control circuit to each of the connection points in the form of a ring, connecting a sense resistance for detection of a total current to the output terminals of the motor coils and the motor coil control circuits in series, respectively, making a voltage at both of the connection ends of one coil to be the same level to make microangle drive, controlling a voltage introduced to one of the connection points to be a high impedance gradually to make microangle drive until n-phase excitation starts, controlling a voltage of the same connection point to be a level different from that of the start gradually so as to make microangle drive until (n−1) phase excitation starts, and repeating these steps so as to gradually increase and decrease the dimension of drive vectors which are generated between each of the motor coils and a rotor and have a different direction to one another so that a composite vector of these drive vectors changes its direction gradually.

* * * * *